(12) United States Patent
Chang (10) Patent No.: US 7,562,464 B2
(45) Date of Patent: Jul. 21, 2009

(54) METHOD AND DEVICE FOR MEASURING PROPELLER SURFACE

(76) Inventor: Fu-Kue Chang, No. 43, Jiamin St., Daliao Township, Kaohsiung County (TW)

(*) Notice: Subject to any disclaimer, the term of this patent is extended or adjusted under 35 U.S.C. 154(b) by 30 days.

(21) Appl. No.: 11/956,475

(22) Filed: Dec. 14, 2007

(65) Prior Publication Data

US 2008/0209747 A1 Sep. 4, 2008

(30) Foreign Application Priority Data

Mar. 1, 2007 (TW) .............................. 96106919 A (51) Int. Cl.
*G01B 5/00* (2006.01)
(52) U.S. Cl. .......................................... 33/530; 33/551
(58) Field of Classification Search ................ 33/530, 33/551, 553, 554, 832, 833
See application file for complete search history.

(56) References Cited

U.S. PATENT DOCUMENTS

| 2,248,973 | A | * | 7/1941 | Eby ............................. 33/530 |
| 2,941,301 | A | * | 6/1960 | Wright ........................ 33/530 |
| 3,380,170 | A | * | 4/1968 | Read ........................... 33/530 |
| 4,056,888 | A | * | 11/1977 | Hughey, Jr. .................. 33/530 |
| 4,411,073 | A | * | 10/1983 | Ryan ........................... 33/530 |
| 4,642,901 | A | * | 2/1987 | Webb .......................... 33/530 |
| 6,532,678 | B2 | * | 3/2003 | Morgan ....................... 33/549 |
| 7,024,787 | B2 | * | 4/2006 | Varsell et al. ................ 33/547 |
| 2002/0095807 | A1 | * | 7/2002 | Morgan ....................... 33/530 |
| 2009/0030648 | A1 | * | 1/2009 | Hunter et al. ................. 33/503 |

* cited by examiner

*Primary Examiner*—G. Bradley Bennett
(74) *Attorney, Agent, or Firm*—Alan Kamrath; Kamrath & Associates PA (57) ABSTRACT

A device for measuring a vane surface contour of a propeller includes a shaft extending through a hub of the propeller and rotatable about a vertical axis. A measuring rod is movable in a direction parallel to the vertical axis to abut a measuring end thereof against a surface of one of a plurality of vanes on the hub. The measuring end moves in the direction parallel to the vertical axis in response to a surface contour of the surface when the shaft rotates. The measuring rod is movable in a radial direction perpendicular to the vertical axis such that the measuring end of the measuring rod is movable between an innermost radial position and an outermost radial position of the surface. The measuring end is pivotable relative to the vertical axis about a movable portion thereof to adjust an angle between the measuring rod and the vertical axis.

8 Claims, 7 Drawing Sheets

METHOD AND DEVICE FOR MEASURING PROPELLER SURFACE

BACKGROUND OF THE INVENTION

1. Field of the Invention

The present invention relates to a method for measuring a propeller surface and, more particularly, for measuring a vane surface contour of a propeller or the like. The present invention also relates to a device for measuring the vane surface contour of the propeller or the like.

2. Description of Related Art

Figure 1:
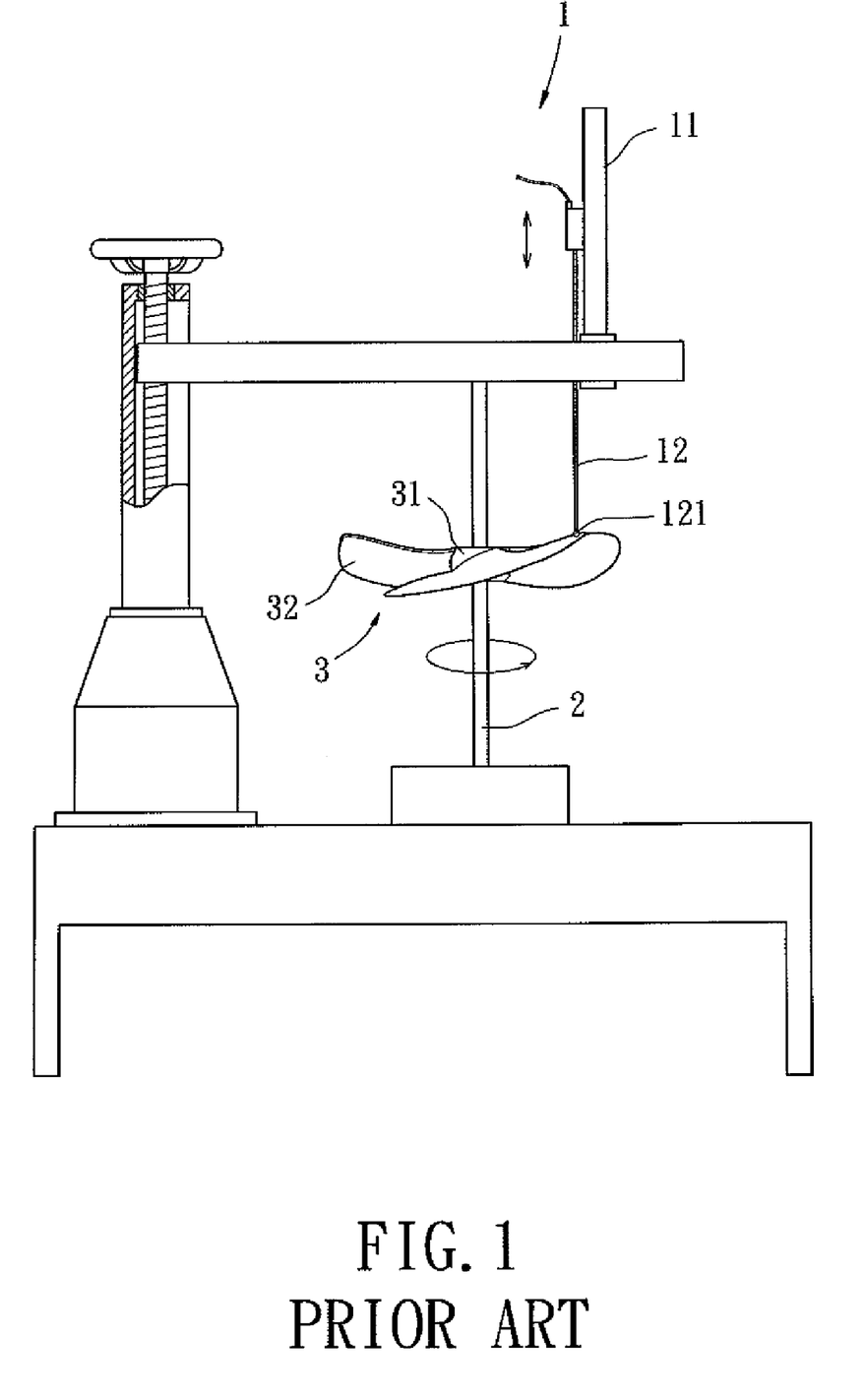
FIG. 1 shows a side view of a propeller and a conventional device for measuring a vane surface contour of the propeller.

FIG. 1 shows a conventional surface contour measuring device including a measuring module 1 and a seat 2. A propeller 3 is rotatably mounted to the seat 2 by a shaft and located below the measuring module 1. The propeller 3 includes a hub 31 and a plurality of vanes 32 formed on the hub 31. The measuring module 1 includes a measuring unit 11 and a measuring rod 41 movable in a vertical direction and having a measuring end 121.

Figure 2:
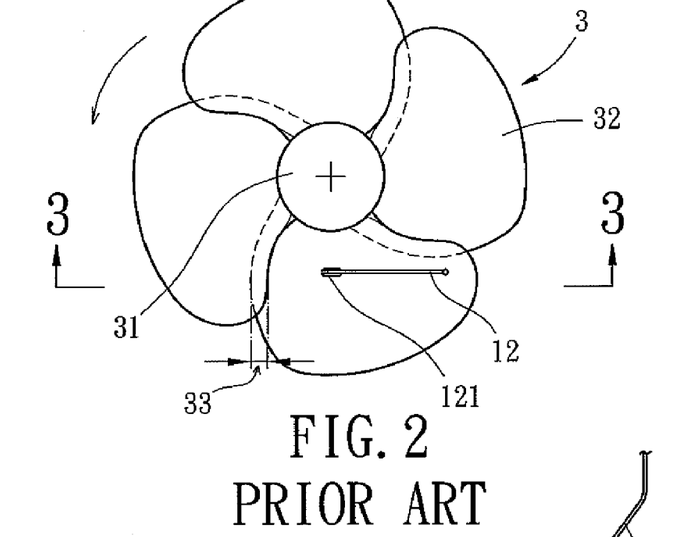
FIG. 2 shows a top view of a propeller and a measuring rod of another conventional device for measuring a vane surface contour of the propeller having an overlapped section between two adjacent vanes.
Figure 3:
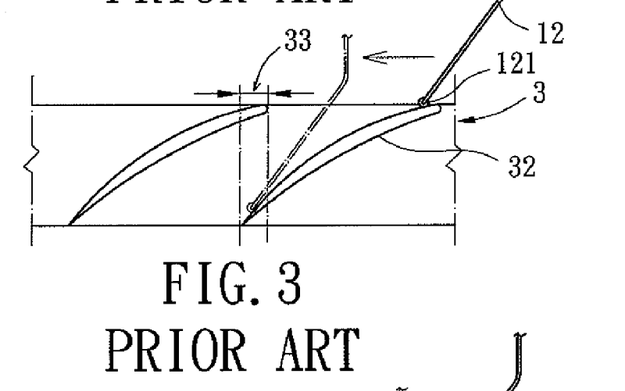
FIG. 3 shows a cross sectional taken alone section line 3-3 of FIG. 2, illustrating measurement of the overlapped section of a lower one of the two adjacent vanes of the propeller.

The measuring end 121 of the measuring rod 41 is moved downward until it rests on a top surface of one of the vanes 32 due to gravitational force. The measuring end 121 moves on the top surface of the vane 32 when the propeller 3 is rotated and, thus, moved relative to the measuring end 121. Specifically, the measuring end 121 moves upward or downward in response to the contour of the top surface of the vane 32 whereas the measuring unit 11 moves vertically. Next, the measuring rod 41 is moved in the radial direction relative to the hub 31 to another position, and the propeller 3 is rotated again. Movement of the measuring rod 41 in the radial direction to a different position and rotation of the propeller 3 are repeated to obtain data corresponding to various points of the top surface contour of the vane 32. Thus, the measuring module 1 can obtain the data corresponding to the top surface contour of the vane 32 and simulate the top surface contour of the vane 32. However, the measuring module 1 can not be utilized to measure the vane surface contour of a propeller 3 whose vanes 32 are overlapped in an axial direction. Specifically, for a propeller 3 (see FIGS. 2 and 3) including an overlapped section 33 at two adjacent vanes 32, the measuring rod 41 will be impeded by the edge of an upper one of the two adjacent vanes 32. As a result, the contour of the overlapped section 33 of the lower one of the two adjacent vanes 32 can not be reached and measured.

Figure 4:
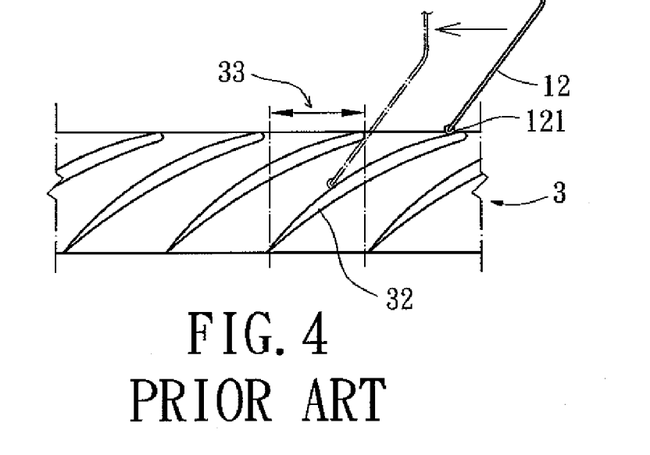
FIG. 4 shows a cross sectional illustrating measurement of a vane surface contour of a propeller having more vanes.

To solve this problem, the measuring rod 41 is modified to include a bend (see FIG. 3) so that the measuring end 121 can enter the overlapped section 33 of the lower vane 32 without being impeded by the edge of the upper vane 32. However, such a measuring rod 41 with a bend can not measure a propeller 3 (see FIG. 4) having more vanes 32 and/or having a large curvature or a larger overlapped section 33. The measuring rod 41 must be changed in response to the larger curvature or larger spacing between the vanes 32, leading to inconvenient measurement.

OBJECTS OF THE INVENTION

An object of the present invention is to provide a method for measuring a vane surface contour of a propeller or the like.

Another object of the present invention is to provide a device having a measuring rod for measuring vane surface contours of propellers or the like having various spacings between vanes without changing the measuring rod.

SUMMARY OF THE INVENTION

To achieve the aforementioned objects, the present invention provides a device for measuring a vane surface contour of a propeller. The device includes a shaft adapted to extend through a hub of the propeller having a plurality of vanes formed on the hub. The shaft is rotatable to rotate the vanes about a vertical axis. The device further includes a measuring unit adapted to be electrically connected to an electronic operational unit. The measuring unit includes a measuring rod having a measuring end and a movable portion. The measuring rod is movable in a direction parallel to the vertical axis to abut the measuring end against a surface of one of the plurality of vanes of the propeller. The measuring end moves in the direction parallel to the vertical axis in response to a surface contour of the surface of one of the plurality of vanes of the propeller when the shaft rotates. The measuring rod is movable in a radial direction perpendicular to the vertical axis such that the measuring end of the measuring rod is movable between an innermost radial position and an outermost radial position of the surface of one of the plurality of vanes of the propeller. In a preferred form, the measuring unit further includes a fixed seat and a movable block movably mounted to the fixed seat along the direction parallel to the vertical axis. The movable portion of the measuring rod is connected to the movable block to move therewith. The measuring end is pivotable relative to the movable block about the movable portion to adjust an angle between the measuring rod and the vertical axis. In the most preferred form, the measuring end includes a roller adapted to abut against the surface of one of the plurality of vanes of the propeller. The fixed seat is movably mounted to a horizontal beam perpendicular to the vertical axis to allow adjustment of a distance between the fixed seat and the shaft. The horizontal beam is mounted to an adjusting seat and movable in a direction parallel to the vertical axis to allow adjustment of a height of the horizontal beam.

A method for measuring a vane surface contour of a propeller according to the preferred teachings of the present invention includes mounting a hub of a propeller on a shaft. The angle between a measuring rod of a measuring unit and the shaft is adjusted. The measuring rod of the measuring unit is moved in a radial direction until a measuring end of the measuring rod is able to reach the innermost radial position of the surface of one of the vanes. The measuring end of the measuring rod abuts against a surface of one of a plurality of vanes on the hub. The shaft is rotated to change a relative position of the measuring end over the surface of the vane to measure data corresponding to a contour of the surface. The surface contour data are analyzed by an electronic operational unit electronically connected to the measuring unit to obtain the surface contour of the propeller through simulation.

Other objects, advantages and novel features of this invention will become more apparent from the following detailed description when taken in conjunction with the accompanying drawings.

DETAILED DESCRIPTION OF THE PREFERRED EMBODIMENTS

Figure 5:
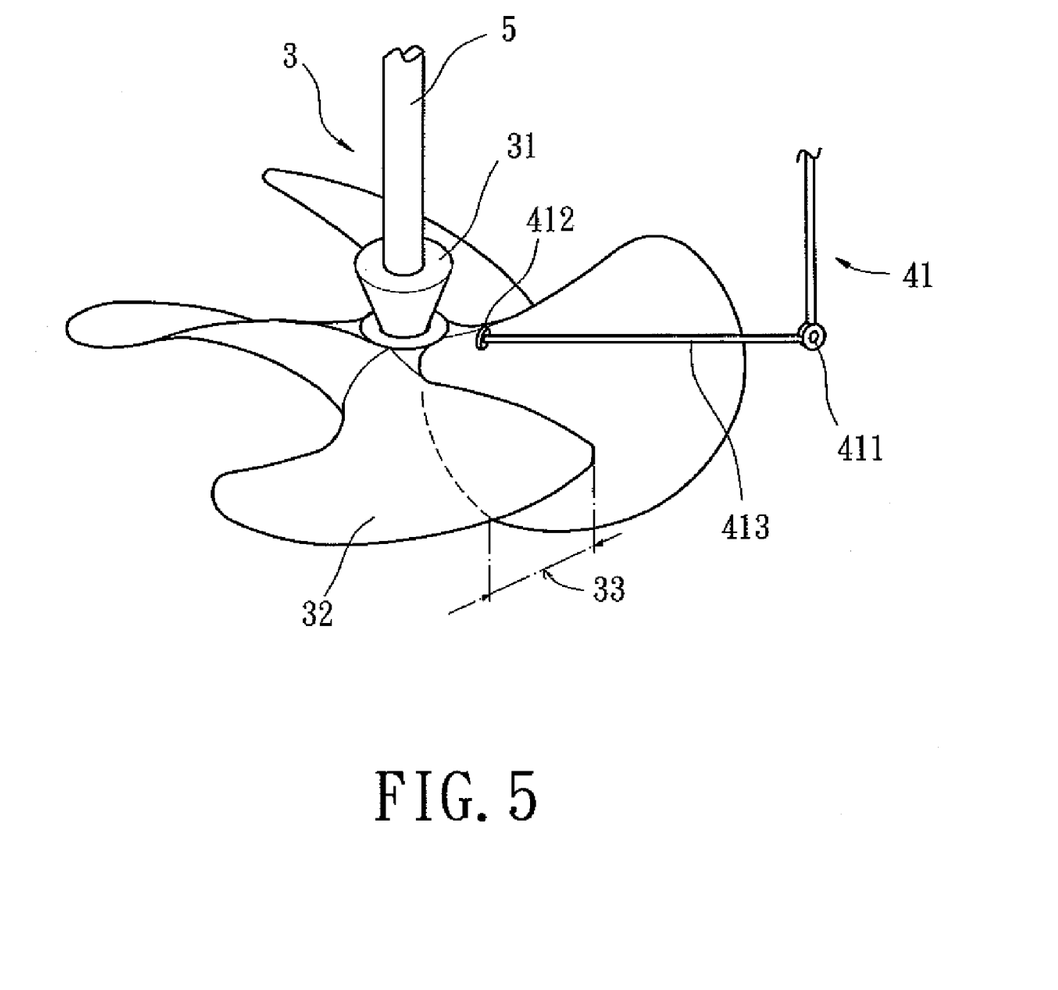
FIG. 5 shows a perspective view of a propeller with fewer vanes and a measuring rod of a device for measuring a vane surface contour of the propeller of a first embodiment according to the preferred teachings of the present invention.
Figure 6:
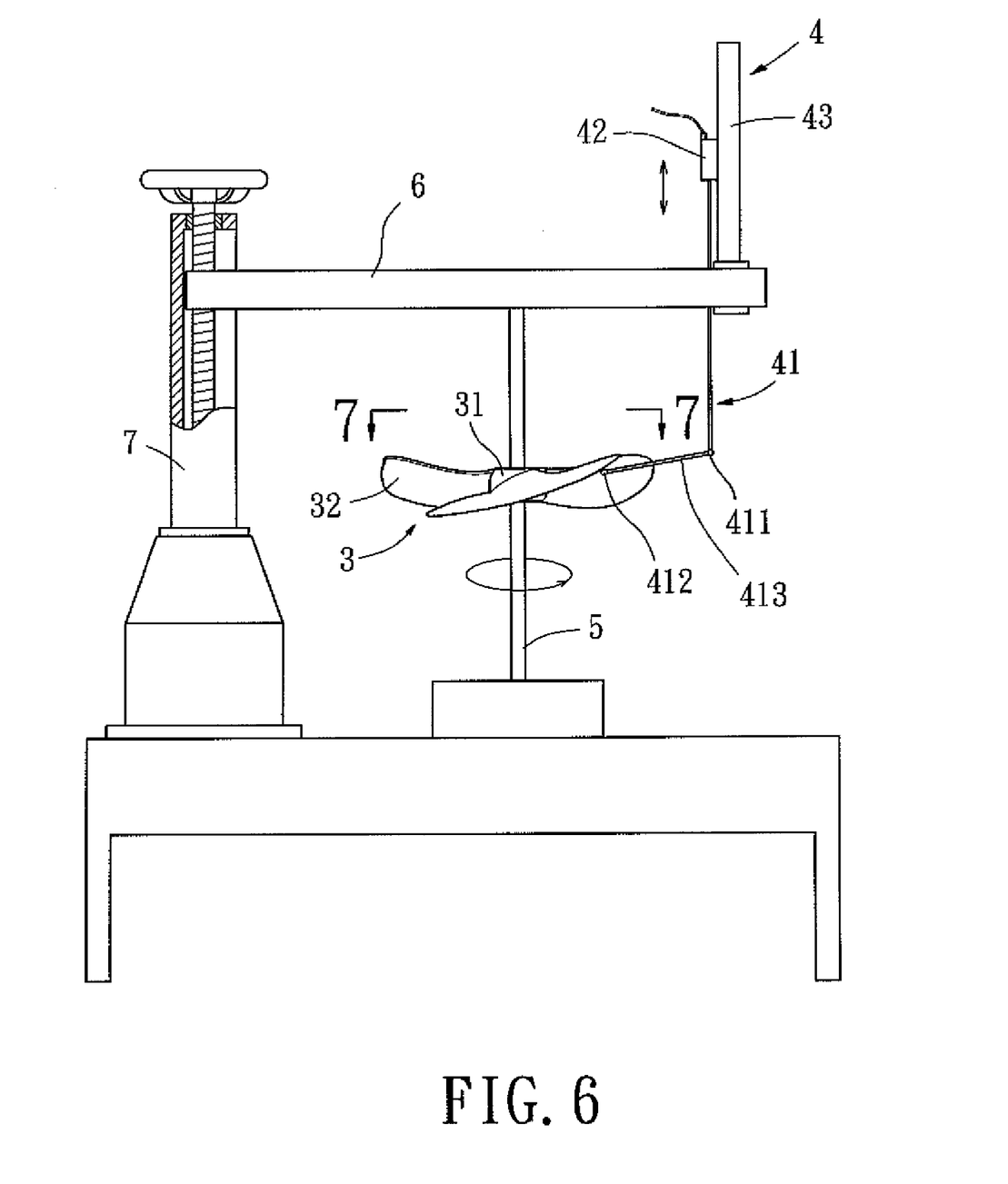
FIG. 6 shows a partly-sectioned side view of the device of FIG. 5.

Referring to FIGS. 5 and 6, a device for measuring a vane surface contour of a propeller 3 of a first embodiment according to the preferred teachings of the present invention includes a measuring unit 4 and a shaft 5. The propeller 3 includes a hub 31 and a plurality of vanes 32 formed on an outer periphery of the hub 31. The vanes 32 extend along a radial direction of the shaft 5. The hub 31 is mounted to the shaft 5 to rotate therewith. Specifically, the hub 31 and the vanes 32 rotate through a rotational area when the shaft 5 rotates about a vertical axis. The measuring unit 4 is electrically connected to an electronic operational unit (not labeled) and located at a side of the shaft 5 for carrying out vane surface contour measurement of the propeller 3.

The measuring unit 4 is shown in the form of a gravitational type. However, it can be appreciated that the measuring unit 4 can be of other types. In the preferred form shown, the measuring unit 4 includes a fixed seat 43, a movable block 42 movably mounted to the fixed seat 43 in a vertical direction parallel to the vertical axis, and a measuring rod 41. The measuring rod 41 includes a measuring section 413 having a first, measuring end 412 and a second, movable portion 411 pivotably connected to a lower end of a vertical rod whose upper end is fixed to the movable block 42. The movable portion 411 is provided between the two ends of the measuring rod 41. The measuring end 412 is pivotable about the movable portion 411. Thus, the angle between the measuring section 413 and the shaft 5 (or the vertical direction) can be adjusted. It can be appreciated that the measuring section 413 forms a bend of the measuring rod 41 and is located between two ends of the measuring rod 41. The pivotal connection between the measuring section 413 and the vertical rod is distant to the measuring end 412. In the most preferred form shown, a horizontal beam 6 includes an end fixed to an adjusting seat 7, and the fixed seat 43 is movably mounted to the other end of the horizontal beam 6 in the radial direction and/or the vertical direction. The relative position between the measuring rod 41 and the shaft 5 can be adjusted. The adjusting seat 7 can be operated to adjust the heights of the horizontal beam 6 and the measuring rod 41.

Operation of the measuring device according to the preferred teachings of the present invention will now be described. With reference to FIG. 6, the angle between the measuring rod 41 of the measuring unit 4 and the shaft 5 is adjusted, and then the measuring rod 41 is moved in a radial direction until the measuring end 412 of the measuring rod 41 is able to reach the innermost radial position of the surface of one of the vanes 32. Then, the measuring section 413 of the measuring unit 4 is moved radially toward the shaft 5 to a location within the rotational area of the propeller 3. With reference to FIG. 6, the measuring end 412 of the measuring unit 4 is moved vertically until it abuts against a top surface of one of the vanes 32 under the action of gravity. Preferably, the measuring end 412 includes a roller (not labeled) to reduce the friction with the top surface of the vane 32 and to avoid vibrations of and stress concentration on the measuring rod 41.

Figure 7:
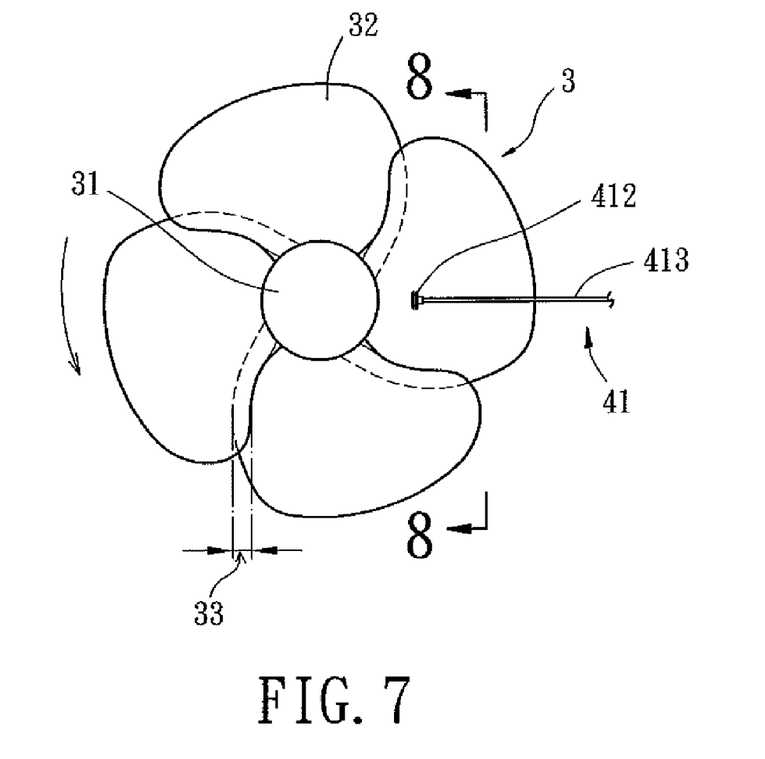
FIG. 7 shows a cross sectional view of the propeller and the measuring rod of FIG. 6 according to section line 7-7 of FIG. 6.

With reference to FIG. 7, the propeller 3 is then rotated such that a relative position of the measuring end 412 over the surface of the vane 32 is changed to let the measuring end 412 slide over the vane 32. Specifically, the measuring end 412 moves upward or downward in response to the contour of the top surface of the vane 32 while the measuring end 412 moves through an arc path on the top surface of the vane 32. Data of the heights of the points of the arc path having the same distance to the shaft 5 are measured through vertical displacement of the movable block 42 and sent to the electronic operational unit.

Figure 8:
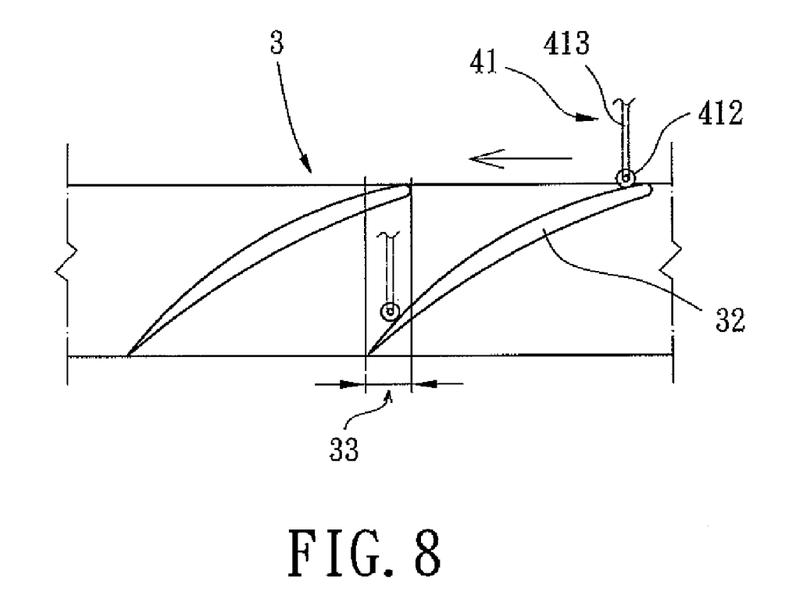
FIG. 8 shows a cross sectional view of the propeller and the measuring rod of FIG. 6 according to section line 8-8 of FIG. 7

With reference to FIG. 8, the measuring rod 41 is then moved in the radial direction relative to the hub 31 to another location having a different distance to the shaft 5, and the propeller 3 is rotated again to obtain data corresponding to the heights of the points of another arc path on the top surface of the vane 32. The procedures of moving the measuring rod 41 in the radial direction and rotating the shaft 5 are repeated until the measuring rod 41 has moved from the outermost radial point through the innermost radial point (or in a reverse direction) with a predetermined increment. The data corresponding to the top surface contour of the vane 32 obtained through the measuring device according to the preferred teachings of the present invention are sent to the electronic operational unit that analyzes the data to simulate the top surface contour of the vane 32. By doing so, the vane surface contours of the propeller 3 can be obtained. It can be appreciated that even through an overlapped section 33 in an axial direction exists between two adjacent vanes 32, the measuring rod 41 is not impeded by the edge of the upper one of the two adjacent vanes 32. As a result, the contour of the overlapped section 33 of the lower one of the two adjacent vanes 32 can be reached and measured (see FIG. 8).

Figure 9:
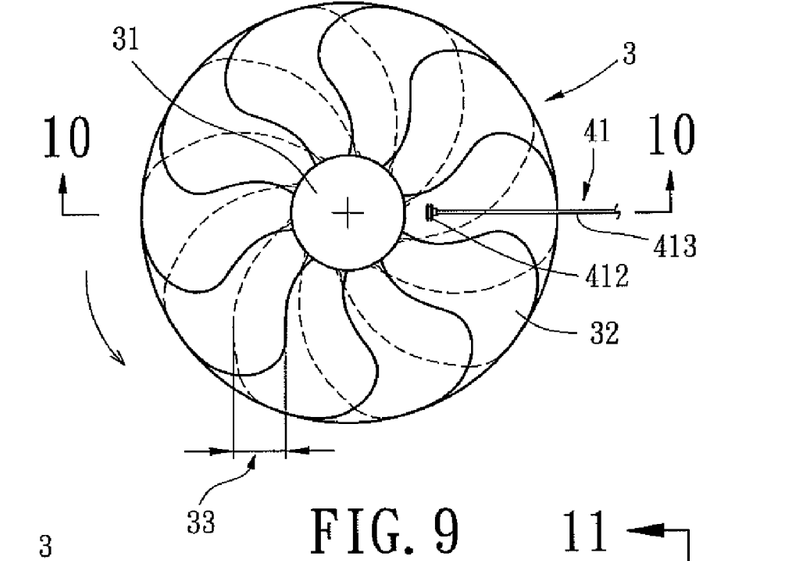
FIG. 9 shows a top view of a propeller with more vanes and the measuring rod of FIG. 6.
Figure 10:
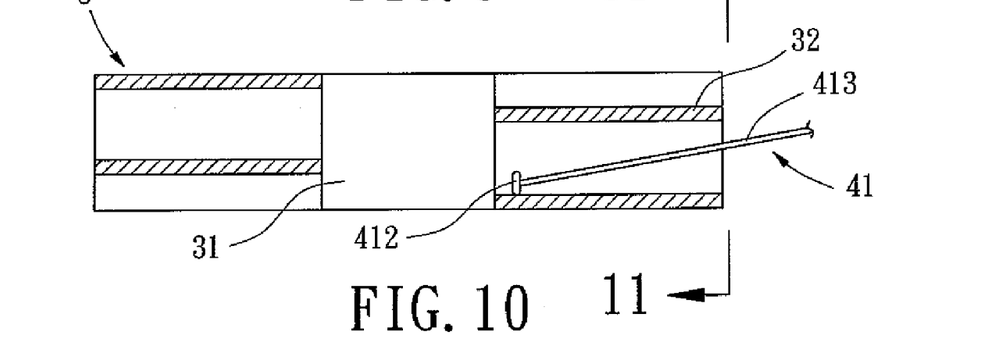
FIG. 10 shows a cross sectional view of the propeller and the measuring rod of FIG. 9.
Figure 11:
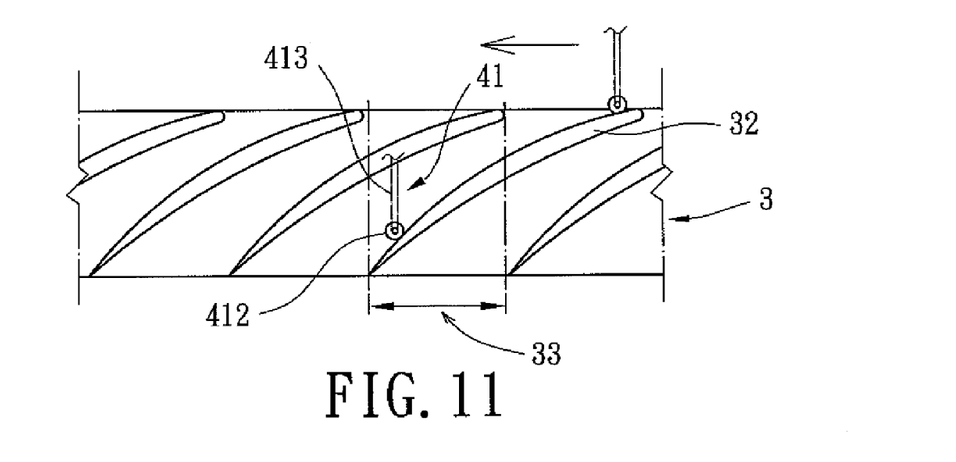
FIG. 11 shows a cross sectional view of the propeller and the measuring rod of FIG. 9 according to section line 11-11 of FIG. 10.

With reference to FIGS. 9-11, it can be appreciated that the measuring device according to the preferred teachings of the present invention can also be utilized to measure a propeller 3 having more vanes 32 and having a larger overlapped area 33 between two adjacent vanes 32. The procedures of measuring the propeller 3 with more vanes 32 shown in FIG. 10 are identical to those of measuring the propeller 3 with fewer vanes 32 shown in FIG. 5. It can be appreciated that the measuring section 413 can be pivoted to a desired angular position relative to the horizontal plane when required.

Figure 12:
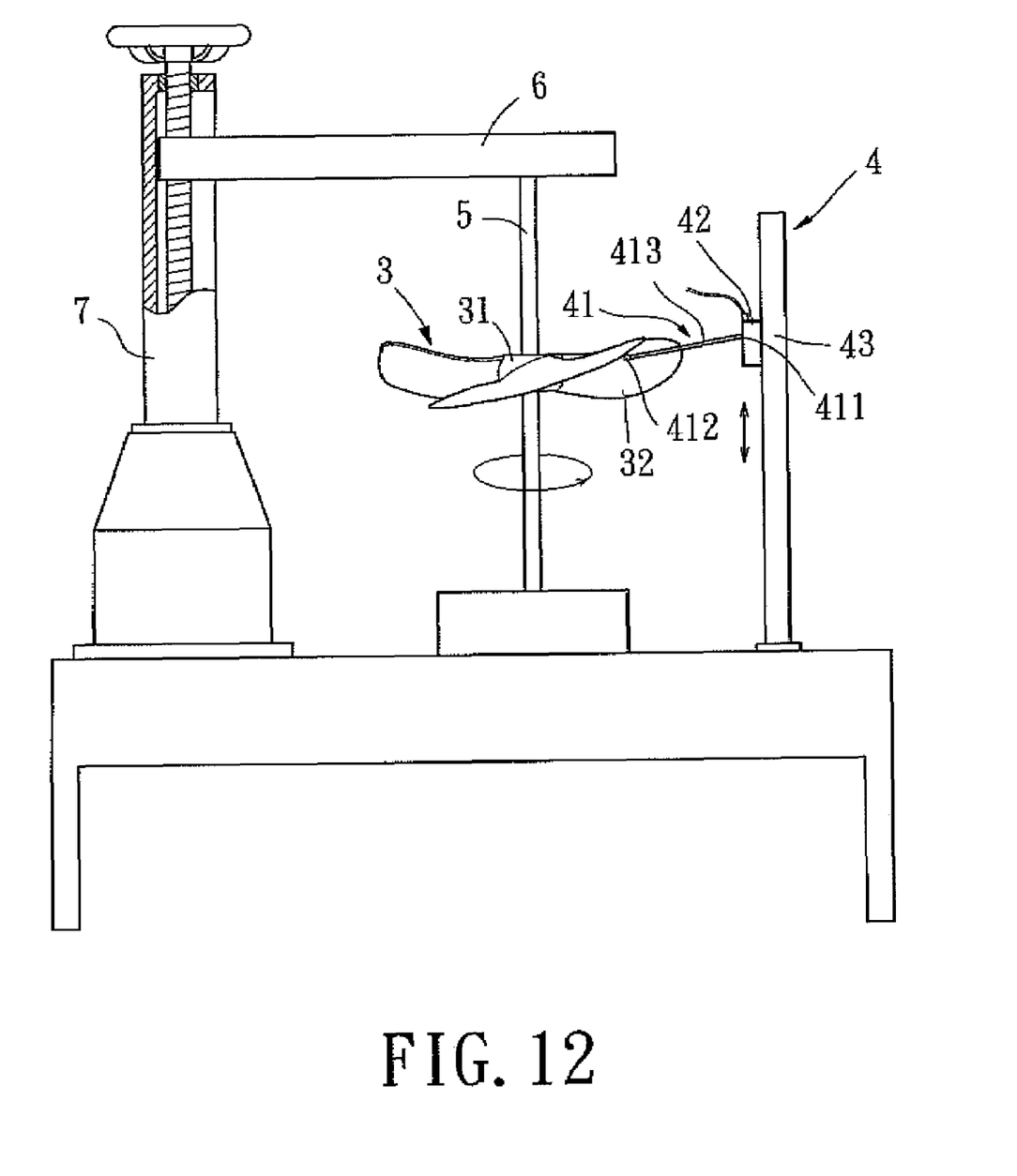
FIG. 12 shows a side view of a propeller and a device for measuring a vane surface contour of the propeller of a second embodiment according to the preferred teachings of the present invention.

FIG. 12 shows a device for measuring a vane surface contour of a propeller 3 of a second embodiment according to the preferred teachings of the present invention. Only the differences between the two embodiments will be described. In the second embodiment, the fixed seat 43 of the measuring unit 4 extends in the vertical direction parallel to the shaft 5. Furthermore, the movable portion 411 is provided on the second end of the measuring rod 41 with directly and pivotably connected to the movable block 42 that is movably mounted to the fixed seat 43 in the vertical direction.

The measuring device according to the preferred teachings of the present invention can be utilized to measure propellers 3 with more or fewer vanes 32 having a smaller or larger overlapped section 33 between two adjacent vanes 32 or having a larger curvature in a convenient way without the need of changing the measuring rod 41. It can be appreciated that the angle between the measuring section 413 and the vertical axis can be adjusted to be suitable for measuring propellers 3 with more vanes 32 having a smaller or larger overlapped section 33 between two adjacent vanes 32 or having a larger curvature. The vane surface contour measurement according to the preferred teaching of the present invention is effective, convenient, and time-saving. It can be appreciated that the method and device according to the preferred teachings of the present invention can be utilized to measure vane surface contours of other objects such as impellers or the like.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A device for measuring a vane surface contour of a propeller comprising:
    a shaft adapted to extend through a hub of a propeller having a plurality of vanes formed on the hub, with the shaft being rotatable to rotate the vanes about a vertical axis, and the vanes extending along radial directions of the shaft;
    a measuring unit adapted to be electrically connected to an electronic operational unit, with the measuring unit including a measuring rod having a measuring end and a movable portion, with the measuring rod being movable in a direction parallel to the vertical axis to abut the measuring end against a surface of one of the plurality of vanes of the propeller, with the measuring end moving in the direction parallel to the vertical axis in response to a surface contour of the surface of one of the plurality of vanes of the propeller when the shaft rotates, with the measuring rod being movable in a radial direction perpendicular to the vertical axis such that the measuring end of the measuring rod is movable between an innermost radial position and an outermost radial position of the surface of one of the plurality of vanes, with the measuring rod having an angle to the vertical axis, and with the measuring end being pivotable about the movable portion to adjust the angle between the measuring rod and the vertical axis.

2. The device for measuring a vane surface contour of a propeller as claimed in claim 1, with the measuring end being provided between two ends of the measuring rod to adjust the angle between the measuring rod and the vertical axis.

3. The device for measuring a vane surface contour of a propeller as claimed in claim 1, with the measuring unit further comprising, in combination: a fixed seat and a movable block movably mounted to the fixed seat along the direction parallel to the vertical axis, with the movable portion of the measuring rod being connected to the movable block to move therewith, and with the measuring rod being pivotable relative to the movable block about the movable portion to adjust the angle between the measuring rod and the vertical axis.

4. The device for measuring a vane surface contour of a propeller as claimed in claim 3, with the measuring end including a roller adapted to abut against the surface of one of the plurality of vanes of the propeller.

5. The device for measuring a vane surface contour of a propeller as claimed in claim 4, with the device further comprising, in combination: a horizontal beam perpendicular to the vertical axis, with the fixed seat being movably mounted to the horizontal beam to allow adjustment of a distance between the fixed seat and the shaft.

6. The device for measuring a vane surface contour of a propeller as claimed in claim 5, with the device further comprising, in combination: an adjusting seat, with the horizontal beam being mounted to the adjusting seat and movable in a direction parallel to the vertical axis to allow adjustment of a height of the horizontal beam.

7. A method for measuring a vane surface contour of a propeller comprising:
    mounting a hub of a propeller on a shaft, with the propeller including a plurality of vanes formed on the hub and the vanes extending along radial directions of the shaft;
    adjusting the angle between a measuring rod of a measuring unit and the shaft and then moving the measuring rod in a radial direction until a measuring end of the measuring rod is able to reach the innermost radial position of the surface of one of the vanes;
    abutting the measuring end against a surface of one of the vanes, with the measuring unit being electronically connected to an electronic operational unit;
    rotating the shaft to change a relative position of the measuring end over the surface of the vane to let the measuring end slide over the vane, and then the measuring end being moved in a direction from a outermost radial point to a innermost radial point of the vane or being moved in a reverse direction with a predetermined increment for repeatedly sliding over the vane with various distances between the measuring end and the hub to measure data corresponding to contours of the surface; and
    analyzing the surface contour data with the electronic operational unit to obtain the surface contour of the propeller through simulation.

8. The method for measuring a vane surface contour of a propeller as claimed in claim 7, with the measuring end including a roller abutting against the surface of one of the plurality of vanes of the propeller when the shaft rotates.

* * * * *